(12) United States Patent
Nakamura et al.

(10) Patent No.: US 8,131,127 B2
(45) Date of Patent: Mar. 6, 2012

(54) BROADCAST RECEIVING APPARATUS AND BROADCAST RECEIVING METHOD

(75) Inventors: Yuta Nakamura, Fuchu (JP); Hirokazu Kawakatsu, Fuchu (JP)

(73) Assignee: Fujitsu Toshiba Mobile Communications Limited, Kawasaki (JP)

( * ) Notice: Subject to any disclaimer, the term of this patent is extended or adjusted under 35 U.S.C. 154(b) by 973 days.

(21) Appl. No.: 12/151,247

(22) Filed: May 5, 2008

(65) Prior Publication Data

US 2009/0148134 A1 Jun. 11, 2009

(30) Foreign Application Priority Data

Dec. 5, 2007 (JP) ................... 2007-315058

(51) Int. Cl.
*H04N 7/26* (2006.01)
(52) U.S. Cl. .............. 386/46; 386/45; 386/125
(58) Field of Classification Search .............. 386/45, 386/125, 46
See application file for complete search history.

(56) References Cited

U.S. PATENT DOCUMENTS

| | | | |
|---|---|---|---|
| 2004/0223727 A1* | 11/2004 | Ohnishi | 386/46 |
| 2005/0117892 A1* | 6/2005 | Nishida | 386/125 |
| 2008/0225942 A1 | 9/2008 | Nakamura et al. | |

FOREIGN PATENT DOCUMENTS

| | | |
|---|---|---|
| JP | 2001-283525 A | 10/2001 |
| JP | 2002-15527 A | 1/2002 |

OTHER PUBLICATIONS

Japanese Office Action dated Oct. 20, 2009 (3 pages), and English translation thereof (4 pages), issued in counterpart Japanese Application Serial No. 2007-315058.
Related Application: Y. Nakamura et al; U.S. Appl. No. 12/072,706, filed Feb. 27, 2008; Contents Reproducing Apparatus.
Kameyama W. and Hanamura T., "Revised Edition of Digital Broadcasting Textbook I", Impress, Oct. 2004, pp. 87-87.

* cited by examiner

*Primary Examiner* — Vivek Srivastava
*Assistant Examiner* — Thong Truong
(74) *Attorney, Agent, or Firm* — Maschoff Gilmore & Israelsen

(57) ABSTRACT

To store TS packet in an external memory connected via an external IF unit at the time shift reproduction time, a buffer for storage is provided at a previous stage and a buffer for reproduction is provided at a subsequent stage. When the data storage in the external memory runs out as the time shift reproduction proceeds, a time shift data managing unit executes a temporary time shift by the buffer for storage and the buffer for reproduction capable of reading and writing at a higher speed than the external memory without mediation of the external memory and then the time shift reproduction mode is changed to the general reproduction mode by a demultiplex mode control unit.

12 Claims, 9 Drawing Sheets

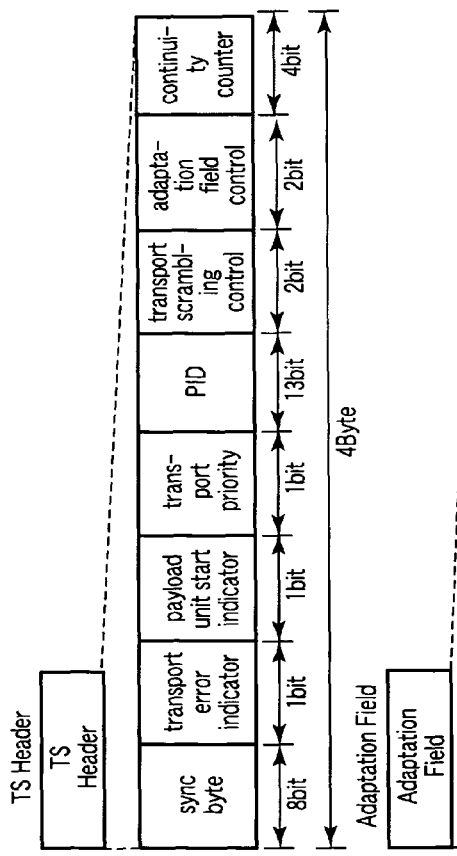
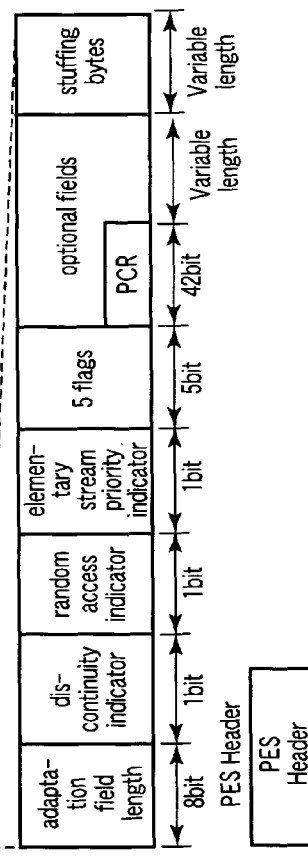
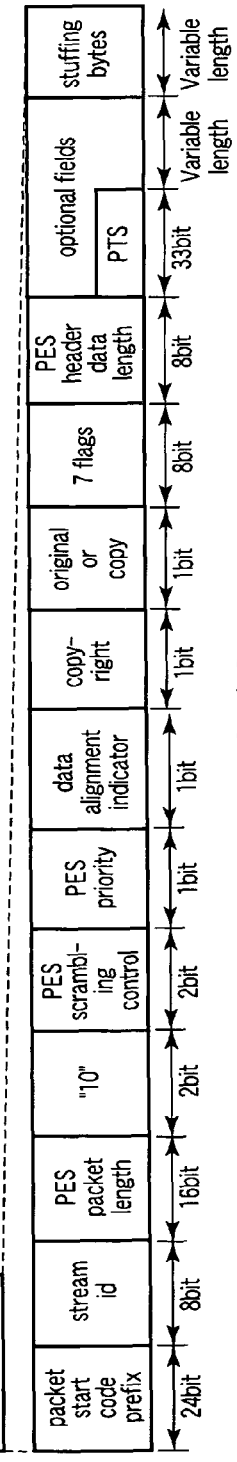
FIG. 3A
FIG. 3B
FIG. 3C

BROADCAST RECEIVING APPARATUS AND BROADCAST RECEIVING METHOD

CROSS-REFERENCE TO RELATED APPLICATIONS

This application is based upon and claims the benefit of priority from prior Japanese Patent Application No. 2007-315058, filed Dec. 5, 2007, the entire contents of which are incorporated herein by reference.

BACKGROUND OF THE INVENTION

1. Field of the Invention

The present invention relates to a broadcast receiving apparatus employed for reception of, for example, terrestrial digital broadcasting.

2. Description of the Related Art

A cellular telephone for a mobile communications system called Third Generation has a function of receiving terrestrial digital broadcasting ("one-segment broadcasting") (cf., for example, W. Kameyama and T. Hanamura, "Revised Edition of Digital Broadcasting Textbook I", Impress, October 2004, pp. 85-87). In the terrestrial digital broadcasting, image data is encoded in H.264/AVC and speech data is encoded in MPEG-2 AAC. The encoded image data and speech data are called "Elementary Streams" (hereinafter called ES), which are superposed on a transport stream in MPEG-2 SYSTEM as Packetized Elementary Stream packets (PES packets) and then transmitted.

Transport stream packets (TS packets) are aligned in the transport stream. In the TS packets, attribute information which indicates the type (attribute) of the bit streams including the video information and audio information, reference clock information which is called a program time standard reference value (PCR) for synchronization in the bit streams and media, and the like can be stored. The TS packets are transmitted from the transmitting side to the receiving side in a wireless or wired method.

The received TS packets are temporarily stored on the receiving side. When the TS packets including the PCR are received, the PCR is used for the control of the STC counter which counts a system time clock (STC) to establish clock synchronization with the transmitting side. More specifically, the receiving side extracts a value by sampling the PCR of the transmitting side at 27 MHz and adjusts the STC by comparing the sampled value with the STC value of the receiving side, i.e. the receiving side executes what is called clock recovery.

In addition, when the STC value counted by the STC counter is greater than a display time stamp (PTS) included in the PES packets, the receiving side reproduces the ES in the PES packets, in synchronization with the STC value. As the stream reproduction method, a time shift reproduction mode is employed, besides a general reproduction mode of sequentially decoding and reproducing the image data and speech data in the TS packets received from the broadcast wave.

In the time shift reproduction mode, the received TS packets are stored in a buffer (time shift storage) while the user cannot view. When the user becomes in a state of viewing, the images and speech in the stored TS packets are sequentially decoded and reproduced while the received TS packets are sequentially stored in the buffer.

In the time shift reproduction mode, the reproduction may be executed at an equal double speed, but a higher speed since the TS packets stored in the buffer are reproduced. When the high-speed reproduction is executed during the time shift reproduction and the speed of reproduction of the stored data remains higher than the speed of storing the input from the broadcast wave, the TS packets stored in the buffer are reduced. After that, when the buffer becomes free, the time shift reproduction mode is changed to the general reproduction mode of reproducing the image data and the speech data without storing the TS packets demultiplexed from the broadcast wave in the buffer.

Therefore, in the time shift reproduction mode, the process of storing the TS packets demultiplexed from the broadcast wave in the buffer and the process of reproducing the TS packets stored in the buffer need to be executed simultaneously.

In addition, for example, a NAND-type flush memory is often used for the buffer. In this case, a data process sequence can be controlled easily by transferring the data to the buffer with the TS packets of a relatively small unit, and the time shift reproduction mode can be returned easily and smoothly to the general reproduction mode by high-speed reproduction or the like. However, overhead of the data transmission is great since the processes are executed in a relatively small unit.

On the other hand, when the data is transferred to the buffer with the TS packets of a relatively great unit, the overhead can be reduced. However, if the time shift reproduction mode is not changed to the general reproduction mode at an appropriate timing, images and sound are interrupted and the reproduction quality is deteriorated.

Conventionally, magnitude of the overhead of the transferred data causes a problem due to the size of the TS packets used in the time shift reproduction mode and transferred to the buffer or the reproduction quality is deteriorated during process of changing the time shift reproduction mode to the general reproduction mode.

BRIEF SUMMARY OF THE INVENTION

An aspect of the present invention to provide a broadcast receiving apparatus which comprises: a receiving unit which receives a broadcast signal; a first memory which stores the broadcast data; a first recording unit which records the broadcast data contained in the received broadcast signal, in the first memory; a second recoding unit which records the data which is read out from the first memory, in a second memory; a retrieving control unit which reads the data from the second memory; a first reproducing unit which reproduces the data recorded in the second memory; a data amount detecting unit which reproduces the data stored in the first memory if the data amount detected by the data amount detecting unit is below a predetermined threshold value.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIGS. 3A to 3C are illustration showings data format of a TS packet received by the broadcast receiving apparatus shown in FIG. 1;

DETAILED DESCRIPTION OF THE INVENTION

An embodiment of the present invention will be described with reference to the accompanying drawings.

Figure 1:
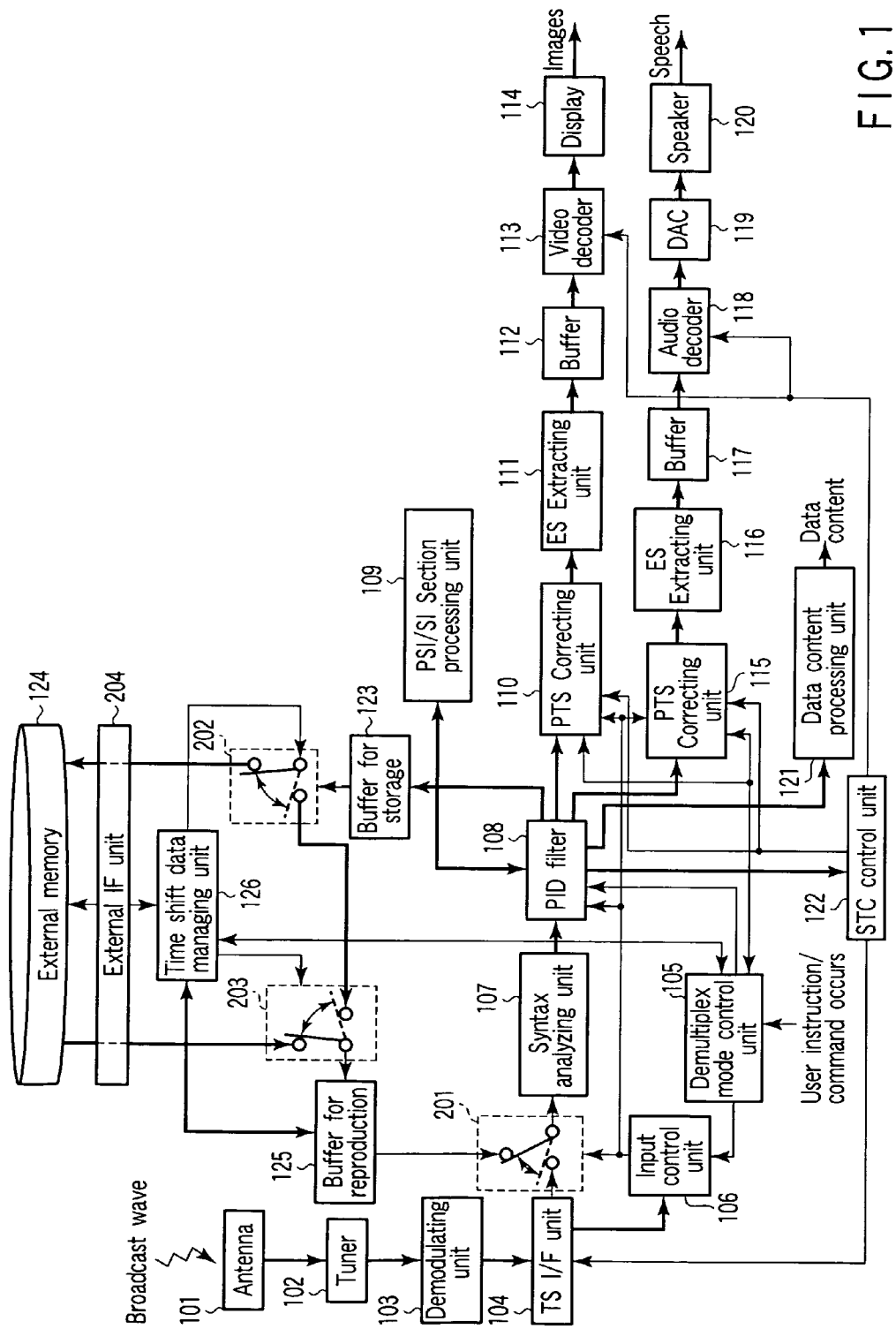
FIG. 1 is a block diagram showing a configuration of a broadcast receiving apparatus according to an embodiment of the present invention.

FIG. 1 shows a configuration of a broadcast receiving apparatus according to the embodiment of the present invention. The broadcast receiving apparatus receives terrestrial digital broadcast and is mounted on, for example, a cellular telephone. In other words, the broadcast receiving apparatus is mounted on a mobile radio terminal capable of establishing speech communications, videophone communications, packet data communications and the like by establishing radio communications with a base station accommodated in a mobile communications network.

The broadcast receiving apparatus may not be mounted only on the mobile radio terminal, but also on an on-board device and a portable music reproducing device for reproducing music data stored in a flash memory, or may be employed as an individual broadcast receiving apparatus. In the following descriptions, reception of the one-segment broadcasting is explained.

An antenna 101 receives a broadcast wave transmitted from a broadcasting station and transfers the received broadcast wave to a tuner 102.

The tuner 102 receives a signal of a channel to be viewed which the user designates via a user interface such as a key device of the mobile radio terminal, of the broadcast wave received by the antenna 101, and obtains a baseband signal.

A demodulating unit 103 demodulates the baseband signal obtained by the tuner 102 and obtains a transport stream. The transport stream is temporarily stored in a buffer for broadcast wave provided in a TS-I/F unit 104.

The TS-I/F unit 104 operates in synchronization with STC notified from a STC control unit 122 to be described later. When the TS-I/F unit 104 detects that a preset designation number (for example, 1) of TS packet data (hereinafter called TS packet) is stored in the buffer for broadcast wave, the TS-I/F unit 104 outputs an interrupt signal to an input control unit 106 to transfer the stored TS packet to a syntax analyzing unit 107. The designation number is 1 here, but may be a different value in accordance with the mounting condition.

A demultiplex mode control unit 105 determines a reproduction mode and a demultiplex mode and controls all the units, in accordance with user's designation using the user interface, occurrence of events such as speech arrival notified from a communications control unit, and information notified from a time shift data managing unit 126 to be described later (data remaining amounts of a buffer for storage 123, an external memory 124 and a buffer for reproduction 125). The determined reproduction mode is notified to the input control unit 106 and the time shift data managing unit 126. The demultiplex mode is notified to a PID filter 108 and PTS correcting units 110, 115.

The apparatus comprises at least three types of the reproduction mode, i.e. general reproduction mode, time shift storage mode, and time shift reproduction mode. The general reproduction mode is a mode of sequentially decoding and reproducing image data and speech data in the received TS packet. The time shift storage mode is a mode of continuing storing the received TS packet in the external memory 124. The time shift reproduction mode as executed subsequently to the time shift storage mode is a mode of sequentially decoding and reproducing the image data and speech data in the TS packet stored in the external memory 124 while storing the received TS packet in the external memory 124.

For example, when the stream reproduction is executed in the general reproduction mode, if the user makes a change direction of changing the reproduction mode to the time shift storage mode via the user interface by stopping viewing or the like, the demultiplex mode control unit 105 detects the change direction and notifies the input control unit 106 of the time shift storage mode. After that, if the user makes a request for changing the time shift storage mode to the time shift reproduction mode or the general reproduction mode via the user interface to execute viewing again, the demultiplex mode control unit 105 detects the request and notifies the input control unit 106 of the detected mode.

As for setting the demultiplex mode by the demultiplex mode control unit 105, for example, when the time shift storage is started by the signal arrival, the demultiplex mode of urging the buffer for storage 123 to transfer the TS packet is set at the PID filter 108. When the user selects executing the time shift reproduction via the user interface, the apparatus checks whether or not the data is present in the external memory 124, on the basis of the notification from the time shift data managing unit 126. If the data is present, the apparatus sets the demultiplex mode of starting the time shift reproduction in the PID filter 108.

The input control unit 106 comprises an interrupt timer of making an operation in response to the reproduction mode notified from the demultiplex mode control unit 105. The interrupt timer generates an interrupt signal at time intervals corresponding to the reproduction mode and the bit rate, and output the generated interrupt signal to a switch 201 and the PID filter 108. The input control unit 106 supplies a change direction to the switch 201, at the bit rate of the TS packet and a timing which corresponds to both the timing at which the interrupt timer generates the interrupt signal and the timing at which the interrupt signal is supplied from the TS-IF unit 104.

The switch 201 reads either of the TS packet stored in the buffer for broadcast wave of the TS-IF unit 104 and the TS packet stored in a buffer for reproduction 125 to be described later, under the change direction from the input control unit 106, and transfer the TS packet to the syntax analyzing unit 107. The number of TS packets is the preset designation number.

Various methods of transferring the TS packets can be conceived. For example, a buffer for string the designated number of TS packets may be provided on the switch 201, the switch 201 may copy the TS packets to the buffer by referring to the buffer for broadcast wave in the TS-I/F unit 104 or the buffer for reproduction 125, and the syntax analyzing unit 107 may refer to the copied TS packets. Otherwise, the syntax analyzing unit 107 may function as the switch 201, make a direct access to the buffer for broadcast wave in the TS-I/F unit 104 or the buffer for reproduction 125, and refer to the TS packets.

The syntax analyzing unit 107 analyzes syntax of the TS packets transferred via the switch 201, detects PID in a TS header in the TS packet, and transfers the PID and the TS packet to the PID filter 108. The syntax analyzing unit 107 is the TS header and adaptation field in the TS packet. Next, a structure of the TS packet is described with reference to FIG. 2.

Figure 2:
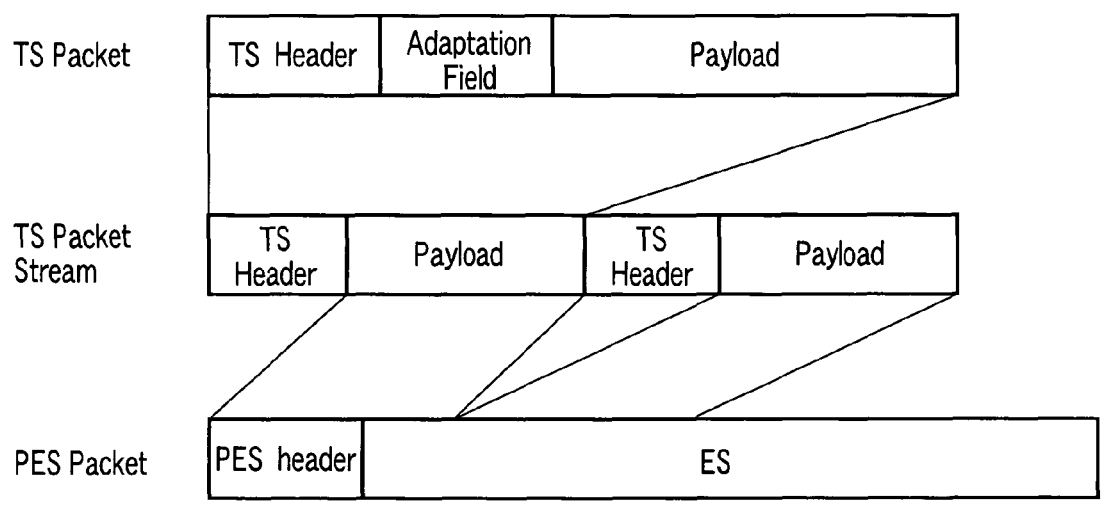
FIG. 2 is an illustration showing data format of TS packets received by the broadcast receiving apparatus shown in FIG. 1.

As shown in FIG. 2, the TS packet is formed as a packet of 188-byte fixed length formed of the adaptation field and payload, i.e. fields which are led by 4-byte TS header and which can be arbitrarily provided.

First, the TS header shown in FIG. 2 is described with reference to FIG. 3(*a*). The TS header includes a synchronous byte (sync byte), a transport error indicator (transport_error_indicator), a payload unit start indicator (payload unit start indicator), a packet priority (a transport priority), a packet identifier (PID), a transport scrambling control (transport scrambling control), an adaptation field control (adaptation_field_control), and a cyclic counter (continuity counter).

The synchronous byte (sync byte) is formed of 8 bits and indicates a leading part of the TS packet to a decoder (113, 118) to be described later. The transport error indicator (transport_error_indicator) is formed of 1 bit and indicates presence of an error mixed in the TS packet.

The payload unit start indicator (payload unit start indicator) is formed of 1 bit and indicates that a new PES packet starts from the payload in the TS packet. The packet priority (a transport priority) is formed of 1 bit and indicates the degree of importance of the TS packet.

The packet identifier (PID) is formed of 13 bits and indicates whether the TS packet is the image data or speech data. The same image data or the same speech data has the same PID. For this reason, the ES to be packetized can be restored by using the PID. The transport scrambling control (transport scrambling control) is formed of 2 bits and indicates presence of scramble of the payload in the TS packet.

The adaptation field control (adaptation_field_control) is formed of 2 bits and indicates presence of Adaptation Field or the payload. For example, "11", "10", "01", and "00" are defined to indicate "Adaptation Field present, payload present", "Adaptation Field present, payload absent", "Adaptation Field absent, payload present" and "reservation (RFU; Reserved for Future Use)", respectively.

The cyclic counter (continuity counter) is formed of 4 bits and is used to detect whether a TS packet having the same PID as the TS packet is partially abandoned.

Next, the Adaptation field shown in FIG. 2 is described with reference to FIG. 3(*b*). The Adaptation field includes a 8-bit adaptation field length, a 1-bit discontinuity indicator (discontinuity_indicator) indicating the presence of change of the time base, a 1-bit random access indicator (random access indicator), a 1-bit stream priority indicator (elementary stream priority indicator), 5-bit "5 flags" (5 flags), a variable-length optional field (optional field), and variable-length stuffing bytes (stuffing bytes).

The "5 flags" include a 1-bit PCR flag (PCR_flag) indicating the presence of the PCR in the adaptation field. The variable-length optional field (optional field) includes PCR of a 42-bit length.

Next, the payload shown in FIG. 2 is described. PES (Packetized Elementary Stream) obtained by adding a header called PES header to the ES and packetizing the ES is divided and stored in the payload. As shown in FIG. 3(*c*), the PES header includes a 24-bit packet start code (packet start code prefix), a 8-bit stream ID (stream id), a 16-bit PES packet length (PES packet length), a 2-bit "10", a 2-bit PES scrambling control (PES scrambling control), a 1-bit PES priority (PES priority), a 1-bit data alignment indicator (data alignment indicator), a 1-bit copy right (copy right), a 1-bit original/copy (original or copy), 8-bit "7 flags" (7 flags), a 8-bit PES header length (PES header data length), variable-length optional fields (optional fields), and variable-length stuffing bytes (stuffing bytes). In the optional fields, 33-bit PTS is described.

The PID filter 108 discriminates whether or not the section data is included in the payload of the TS packet obtained from the syntax analyzing unit 107. If the section data is included in the payload of the TS packet, the PID filter 108 transfers the section data to a PSI/SI section processing unit 109. The section data includes, for example, program specifying information (PSI) and service information (SI).

After that, if table information called program-compliant table (for example, PMT: Program Map Table) that each program has is set by the PSI/SI section processing unit 109, the PID filter 108 separately outputs the TS packet on the basis of the table information, the PID obtained from the syntax analyzing unit 107, the demultiplex mode obtained from the demultiplex mode control unit 105, and the interrupt signal notified from the input control unit 106.

The PID filter 108 discriminates whether the TS packet provided from the syntax analyzing unit 107 is the TS packet read from the buffer for broadcast wave of the TS-IF unit 104 or the TS packet read from the buffer for reproduction 125, on the basis of the interrupt signal from the input control unit 106.

The PSI/SI section processing unit 109 constructs the program-compliant table (PMT) on the basis of the section data provided from the PID filter 108 and sets the program-compliant table (PMT) at the PID filter 108. When the PSI/SI section processing unit 109 is provided of the section data by the PID filter 108, the PSI/SI section processing unit 109 resets the program-compliant table (PMT) for the PID filter 108. If "version_number" of the PMT is not changed for the same program, the PSI/SI section processing unit 109 does not execute the resetting. If the viewed program is changed in accordance with the user's request or the like, the PSI/SI section processing unit 109 constructs a new PMT and resets the new PMT at the PID filter 108.

PMT is one of PSI. The value of PID and the type of the TS packet are associated with the PMT. It can be discriminated in accordance with the PID value whether the TS packet is image data (Video ES), speech data (Audio ES), section data, data content or PCR.

The PCR is stored in the adaptation field in the TS packet as explained above. The PCR is often transmitted together with the payload having images, speech and the like or transmitted alone without the payload. Therefore, one PID value often indicates the PCR alone or both the PCR and images and the like.

The destination of allocation of the TS packet by the PID filter 108 is different in accordance with the reproduction mode notified by the demultiplex mode control unit 105. In the general reproduction mode, the PID filter 108 outputs the TS packet to the PTS correcting unit 110 if the TS packet stores Video ES or outputs the TS packet to the PTS correcting unit 115 if the TS packet stores Audio ES. The PID filter 108 abandons the TS packet if the PID of the TS packet cannot be retrieved by the PMT provided by the PSI/SI section processing unit 109.

In the time shift reproduction mode, the PID filter 108 makes a request for accepting the transfer for the buffer for storage 123 and outputs the request to the buffer for storage 123 if the TS packet is read from the buffer for broadcast wave of the TS-I/F 104. If the TS packet is read from the buffer for reproduction 125, the TS packet of the image data is output to the PTS correcting unit 110 and the TS packet of the speech data is output to the PTS correcting unit 115, similarly to the general reproduction mode. In either case, the PID filter 108 abandons the TS packet if the PID of the TS packet cannot be retrieved by the PMT provided by the PSI/SI section processing unit 109.

In the time shift storage mode, the PID filter 108 transfers the TS packet to the buffer for storage 123. In this case, the PID filter 108 may abandon the TS packet if the PID of the TS packet cannot be retrieved by the PMT provided by the PSI/SI section processing unit 109.

In any one of the reproduction modes, the PID filter 108 outputs the PCR to the STC control unit 122 if the TS packet provided by the syntax analyzing unit 107 is the TS packet read from the buffer for broadcast wave of the TS-I/F 104 and if the TS packet includes the PCR. In a case where the TS packet provided by the syntax analyzing unit 107 is the TS packet read from the buffer for reproduction 125, the PID filter 108 does not output the PCR to the STC control unit 122 even if the TS packet includes the PCR.

The buffer for storage 123 buffers the TS packet output from the PID filter 108 for the time shift reproduction to transfer the TS packet to the external memory 124.

The switch 202 is controlled by the time shift data managing unit 126, and outputs the TS packet buffered by the buffer for storage 123 to the external memory 124 via the external IF unit 204 or to the buffer for reproduction 125 via the switch 203.

The external memory 124 is a flash memory employing a NAND type memory or the like, and detachable memory connected to the mobile radio terminal via the external IF unit 204. The external memory 124 is used as a buffer for storing the data for time shift reproduction.

The external IF unit 204 reads the TS packet from the buffer for storage 123 via the switch 202 and records the read TS packet in the external memory 124, under a direction from the time shift data managing unit 126. In addition, the external IF unit 204 detects the data amount of the TS packet stored in the external memory 124 and notifies the time shift data managing unit 126 of the detected data amount, under a direction from the time shift data managing unit 126. After that, the external IF unit 204 reads the TS packet stored in the external memory 124 and records the TS packet in the buffer for reproduction 125 via the switch 203, under a direction from the time shift data managing unit 126.

The buffer for reproduction 125 buffers the TS packet read from the external memory 124 for the time shift reproduction to transfer the TS packet to the syntax analyzing unit 107 via the switch 201.

When the data stored in the buffer for storage 123, the external memory 124 and the buffer for reproduction 125 is transferred to the other unit, the transferred data is erased. In other words, the transferred data is not copied to the other unit, but erased when transferred to the other unit.

Each of the buffer for storage 123 and the buffer for reproduction 125 has two storage areas. Data equivalent to one block can be stored in one of the storage areas. One block is equivalent to some TS packets. When the data is read from one storage data, writing is executed in the other storage area or the other storage area becomes in a wait status. When the data equivalent to one block is recorded in the other storage area after reading the data from one storage area has been completed, the recorded is read. The external memory 124 has a number of storage areas. Reading and writing the data is executed in each of the areas, each of the blocks.

The buffer for storage 123 and the buffer for reproduction 125 can execute high-speed reading and writing as compared with the external memory 124 since the buffer for storage 123 or the buffer for reproduction 125 does not need mediation of the external IF unit 204 unlike the external memory 124.

The time shift data managing unit 126 manages the TS packets stored in the buffer for storage 123, the external memory 124 and the buffer for reproduction 125, respectively, to execute the time shift reproduction, under directions from the demultiplex mode control unit 105. The time shift data managing unit 126 monitors the amounts of the data stored therein and controls the switches 202 and 203 in accordance with the data amounts and the change of the reproduction mode. In other words, the data transfer among the buffer for storage 123, the external memory 124 and the buffer for reproduction 125 is controlled by the time shift data managing unit 126.

The PTS correcting unit 110 receives the TS packet including the Video ES from the PID filter 108. When the TS packet includes the PTS, the PTS correcting unit 110 corrects the PTS by adding a time delayed by the time shift or the like as needed to the PTS. The delayed time is counted and measured at the STC clock by the STC control unit 122 when the time shift is executed. The TS packet having the PTS corrected as needed is output to an ES extracting unit 111.

However, even if the TS packet includes the PTS in a case where the TS packet provided to the PTS correcting unit 110 is the TS packet read from the buffer for broadcast wave of the TS-I/F 104, the PTS correcting unit 110 does not correct the PTS value since the PTS does not include the time delayed by the time shift. It is discriminated on the basis of the interrupt signal from the input control unit 106 whether the provided TS packet is the TS packet read from the buffer for broadcast wave of the TS-I/F 104 or the TS packet read from the buffer for reproduction 125.

The ES extracting unit 111 extracts the Video ES from the TS packet having the PTS corrected as needed at the PTS correcting unit 110, and outputs the Video ES to the buffer 112. The buffer 112 buffers the Video ES extracted by the ES extracting unit 111.

The Video decoder 113 reads the Video ES stored in the buffer 112, and decodes the Video ES to obtain the image data. When the STC value output from the STC control unit 122 reaches the PTS stored in the Video ES, the Video decoder 113 converts the image data into an image signal and outputs the image signal to a display unit 114. The display unit 114 thereby displays the image based on the Video ES.

A PTS correcting unit 115 is provided with the TS packet storing the Audio ES by the PID filter 108. When the TS packet includes the PTS, the PTS correcting unit 115 corrected the PTS by adding the time delayed by the time shift or the like as needed to the PTS, similarly to the PTS correcting unit 110.

However, even if the TS packet includes the PTS in a case where the TS packet provided to the PTS correcting unit 115 is the TS packet read from the buffer for broadcast wave of the TS-I/F 104, the PTS correcting unit 115 does not correct the PTS value since the PTS does not include the time delayed by the time shift. It is discriminated on the basis of the interrupt signal from the input control unit 106 whether the provided TS packet is the TS packet read from the buffer for broadcast wave of the TS-I/F 104 or the TS packet read from the buffer for reproduction 125.

An ES extracting unit 116 extracts Audio ES from the TS packet having the PTS corrected as needed at the PTS correcting unit 115 and outputs the Audio ES to a buffer 117. The buffer 117 buffers the Audio ES extracted by the ES extracting unit 116.

An Audio decoder 118 reads the Audio ES stored in the buffer 117, and decodes the stored Audio ES to obtain the speech data. When the STC value output by the STC control unit 122 reaches the PTS stored in the Audio ES, the Audio decoder 118 outputs the speech data to a DAC 119, converts the speech data into a speech signal, and outputs the speech data to the speaker 120. The speaker 120 thereby outputs the speech based on the Audio ES.

A data content processing unit 121 processes the data content provided by the PID filter 108. For example, when the data content includes subtitle data, the data content processing unit 119 restores and reproduces the subtitle data from the data content, and superimposes subtitles on the image on the display unit 114.

A display controller (not shown) is provided between the Video decoder 113 and the display unit 114. The display controller can control the image output from the Video decoder 113 and the data content output from the data content processing unit 121 to be superimposed on the display unit 114.

An STC control unit 122 is configured to generate the STC, and provides the generated STC to the TS-I/F 104, the PTS correcting unit 110, the PTS correcting unit 115, the Video decoder 113, the Audio decoder 118 and the like. When the STC control unit 122 is provided with the PCR from the PID filter 108, the STC control unit 122 executes clock recovery on the basis of the PCR and generates the STC at a corrected timing. More specifically, the STC control unit 122 controls an operation frequency of the STC such that a difference between the STC count value and the PCR is decreased.

Next, an operation of the broadcast receiving apparatus having the above-described configuration is explained. In the following descriptions, the general reproduction mode is changed to the time shift reproduction mode and then the time shift reproduction mode is changed to the general reproduction mode. This operation is executed under assumed conditions that, for example, when the user views the terrestrial digital broadcast in the general mode, the user temporarily interrupts viewing or an event such as signal arrival or the like occurs, viewing is executed in the time shift reproduction mode, the buffered TS packet is made short by fast-forward reproduction or CM skip, and viewing is executed again in the general reproduction mode.

Figure 4:
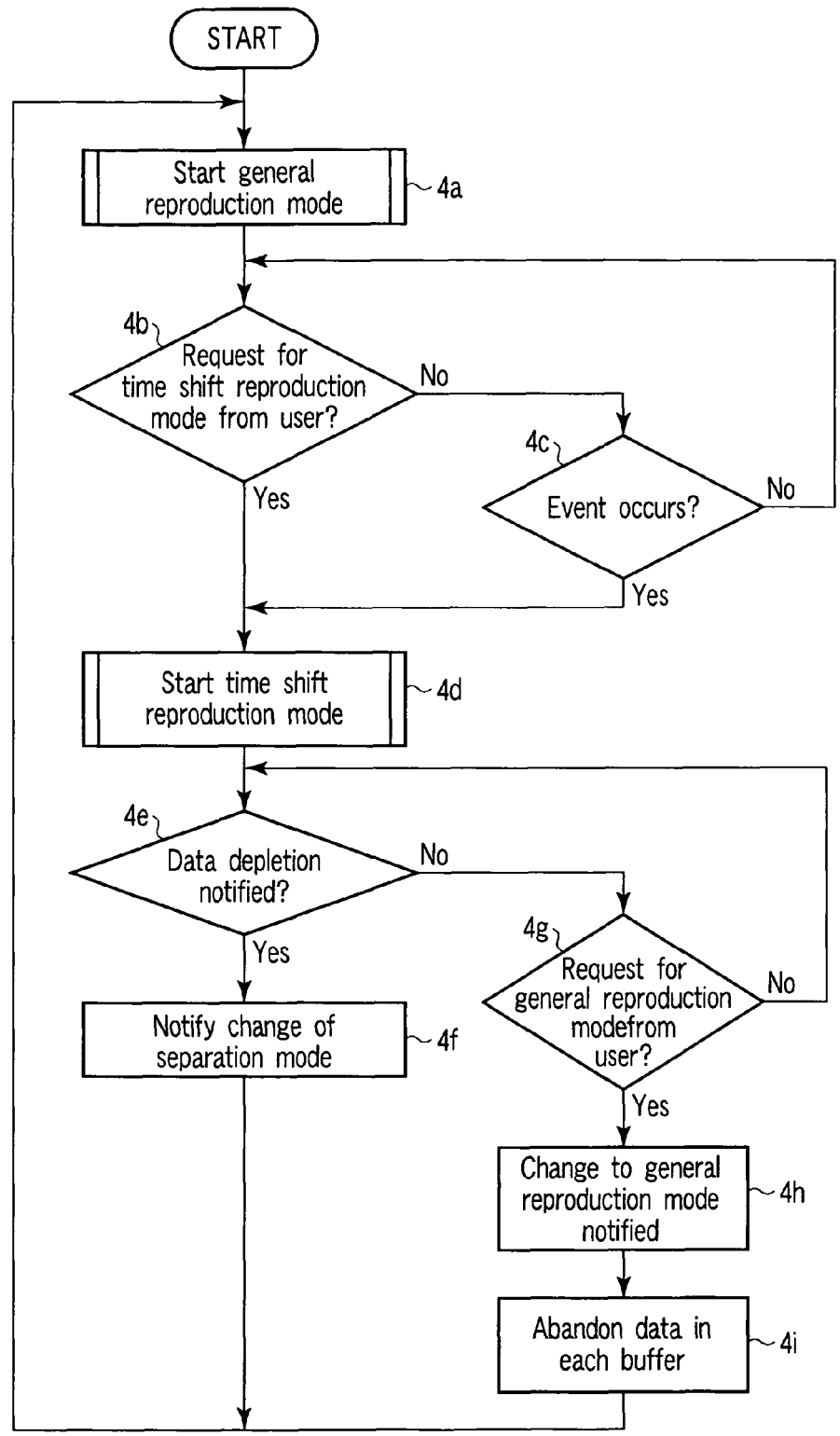
FIG. 4 is a flowchart showing an operation of a demultiplex mode control unit in the broadcast receiving apparatus shown in FIG. 1.

First, an operation of the demultiplex mode control unit 105 is described. FIG. 4 shows a control flow of the demultiplex mode control unit 105. The control flow is started when a direction of receiving the terrestrial digital broadcast is made by the user via the user interface. Constituent elements (tuner 102 and the like) relating to the reception of the terrestrial digital broadcast are activated by the direction.

In step 4a, the demultiplex mode control unit 105 makes a notification to urge the units (input control unit 106, time shift data managing unit 126 and the like) to operate in the general reproduction mode. Then, the demultiplex mode control unit 105 proceeds to step 4b. The input control unit 106 thereby changes the switch 201 to the TS-I/F 104 side such that the syntax analyzing unit 107 can transfer the TS packet from the buffer for broadcast wave of the TS-I/F 104. The status of the switch 201 is fixed while the general reproduction mode is maintained.

Since the PID filter 108 discriminates the setting of the switch 201 executed by the input control unit 106, the PID filter 108 outputs the PID and the TS packet output by the syntax analyzing unit 107 to the corresponding units of the subsequent stage such that the PID and the TS packet can be reproduced as they are without being transferred to the buffer for storage 123. The general reproduction is thereby started.

In step 4b, the demultiplex mode control unit 105 discriminates whether or not a request for the time shift reproduction mode is provided from the user via the user interface. If the demultiplex mode control unit 105 detects the request for the time shift reproduction mode, the demultiplex mode control unit 105 proceeds to step 4d. If the demultiplex mode control unit 105 cannot detect the request for the time shift reproduction mode, the demultiplex mode control unit 105 proceeds to step 4c.

In step 4c, the demultiplex mode control unit 105 discriminates whether or not occurrence of an event such as signal arrival or the like is notified by the communication control unit. If the demultiplex mode control unit 105 discriminates the occurrence of an event, the demultiplex mode control unit 105 proceeds to step 4d. If the demultiplex mode control unit 105 cannot discriminate the occurrence of an event, the demultiplex mode control unit 105 proceeds to step 4b.

In step 4d, the demultiplex mode control unit 105 makes a notification to urge the units (input control unit 106, time shift data managing unit 126 and the like) to operate in the time shift reproduction mode. Then, the demultiplex mode control unit 105 proceeds to step 4e. The input control unit 106 thereby starts the control of periodically changing the switch 201 such that the syntax analyzing unit 107 can selectively change the buffer for broadcast wave of the TS-I/F 104 and the buffer for reproduction 125 and transfer the TS packet from the selected buffer.

The control of change is discriminated by the PID filter 108 and output to the corresponding units of the subsequent stages such that the TS packet transferred from the buffer for broadcast wave of the TS-I/F 104 is transferred via the buffer for storage 123 and the TS packet transferred from the buffer for reproduction 125 via the buffer for storage 123 is reproduced. The time shift reproduction is thereby started.

In step 4e, the demultiplex mode control unit 105 discriminates whether or not a notification that the data buffered for the time shift is depleted is transmitted from the time shift data managing unit 126. If the notification of the data depletion is transmitted, the demultiplex mode control unit 105 proceeds to step 4f. If the notification of the data depletion is not transmitted, the demultiplex mode control unit 105 proceeds to step 4g.

In step 4f, the demultiplex mode control unit 105 notifies the PID filter 108, the PTS correcting unit 110 and the PTS correcting unit 115 of the change of demultiplex mode. In other words, to change the time shift reproduction mode to the general reproduction mode, the demultiplex mode control unit 105 urges the PID filter 108 to discriminate that the TS packet does not need to be transferred to the buffer for storage 123, and urges the PTS correcting unit 110 and the PTS correcting unit 115 to discriminate conditions for returning to the general reproduction mode. The PTS correcting unit 110 and the PTS correcting unit 115 thereby start monitoring to satisfy predetermined return conditions. After that, when the PTS correcting unit 110 and the PTS correcting unit 115 detect that the return conditions are satisfied, the PTS correcting unit 110 and the PTS correcting unit 115 makes a notification to the demultiplex mode control unit 105.

The PID filter 108 thereby stops the transfer of the TS packet to the buffer for storage 123 soon. On the other hand, the PTS correcting unit 110 and the PTS correcting unit 115 stop the PTS correction after a certain period has elapsed, the data in the buffers for time shift reproduction (buffer for storage 123, external memory 124 and buffer for reproduction 125) have been completely depleted and then the predetermined conditions have been satisfied.

In step 4g, the demultiplex mode control unit 105 discriminates whether or not a request for the general reproduction mode is transmitted from the user via the user interface. If the demultiplex mode control unit 105 detects the request for the general reproduction mode, the demultiplex mode control unit 105 proceeds to step 4h. If the demultiplex mode control unit 105 cannot detect the request for the time shift reproduction mode, the demultiplex mode control unit 105 proceeds to step 4e.

In step 4h, the demultiplex mode control unit 105 makes a notification to change the time shift reproduction mode to the general reproduction mode for the time shift data managing unit 126. The demultiplex mode control unit 105 proceeds to step 4i.

In step 4i, the demultiplex mode control unit 105 controls the corresponding units to abandon the data stored in the buffer for storage 123, the external memory 124 and the buffer for reproduction 125. Then, the demultiplex mode control unit 105 proceeds to step 4a to start the general reproduction mode. In particular, the demultiplex mode control unit 105 notifies the time shift data managing unit 126 that the request for the general reproduction mode has been transmitted from the user. The buffer for storage 123 and the buffer for reproduction 125 abandon the data stored therein. The external memory 124 abandons the data stored therein by a process to be described later (step 5f).

Next, an operation of the time shift data managing unit 126 is described. FIG. 5 to FIG. 9 show a control flow of the time shift data managing unit 126. The control flow is started when a direction of starting the time shift reproduction mode is transmitted from the demultiplex mode control unit 105 (step 4d).

First, in step 5a, the time shift data managing unit 126 sets the switch 202 and the switch 203 in the initial status, and starts monitoring the data amount of the TS packet stored in the external memory via the external IF unit 204. Then, the time shift data managing unit 126 proceeds to step 5b. In the initial status of the switch 202 and the switch 203, the switch 202 is changed such that the data stored in the buffer for storage 123 can be transferred to the external memory 124 via the external IF unit 204 and the switch 203 is changed such that the data stored in the external memory 124 can be transferred to the buffer for reproduction 125 via the external IF unit 204.

Figure 6:
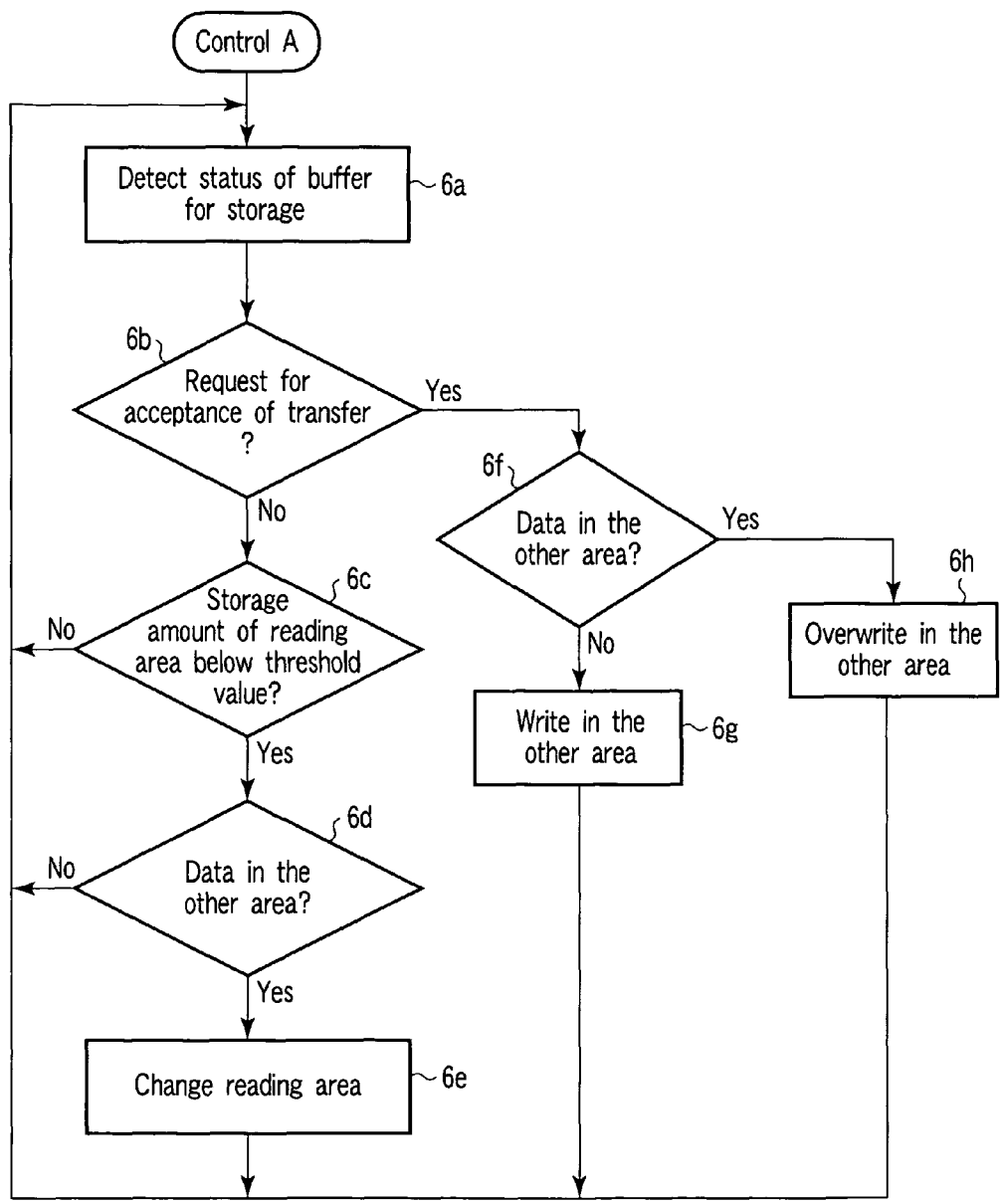
FIG. 6 is a flowchart showing an operation of a time shift data managing unit in the broadcast receiving apparatus shown in FIG. 1.
Figure 7:
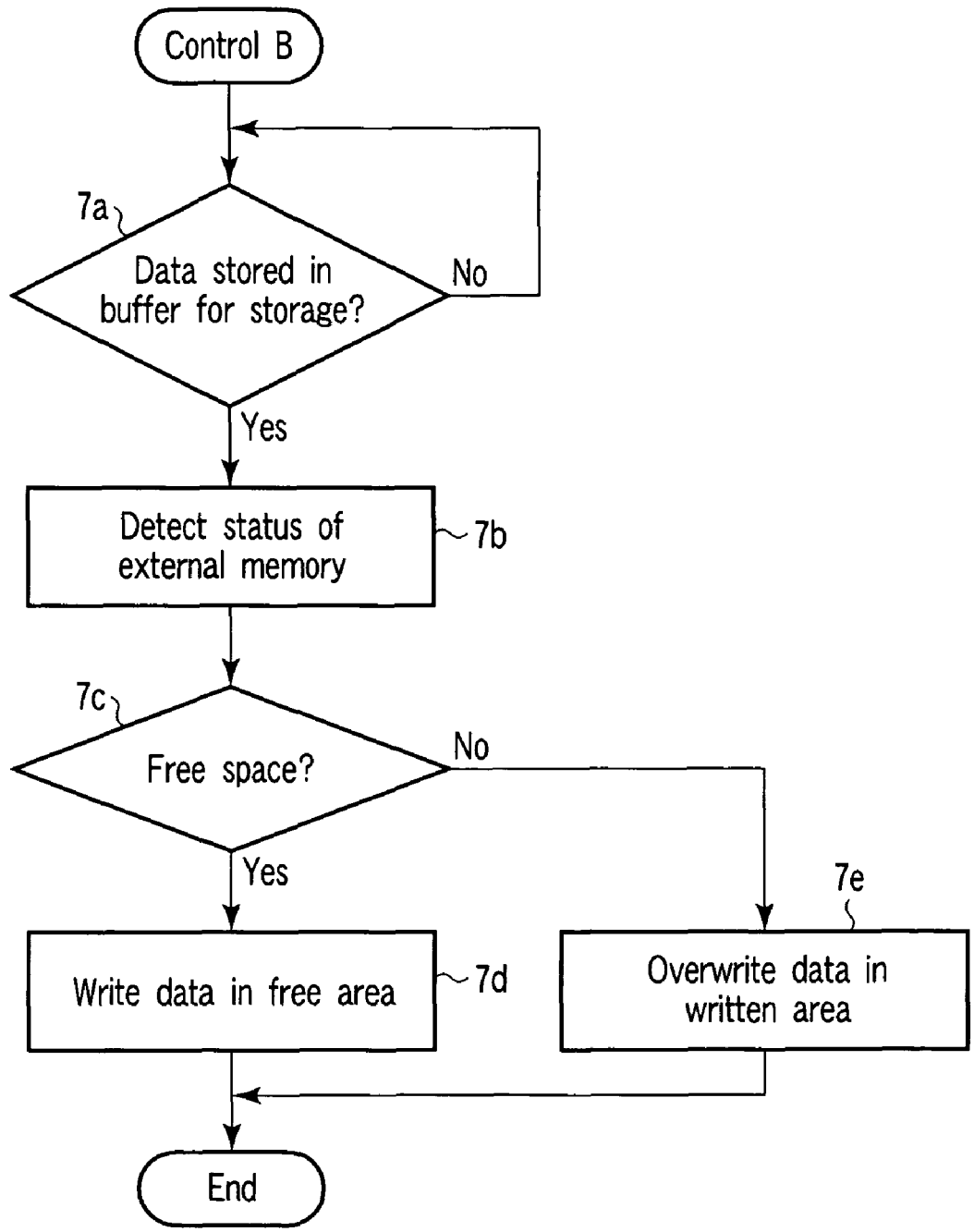
FIG. 7 is a flowchart showing an operation of a time shift data managing unit in the broadcast receiving apparatus shown in FIG. 1.
Figure 8:
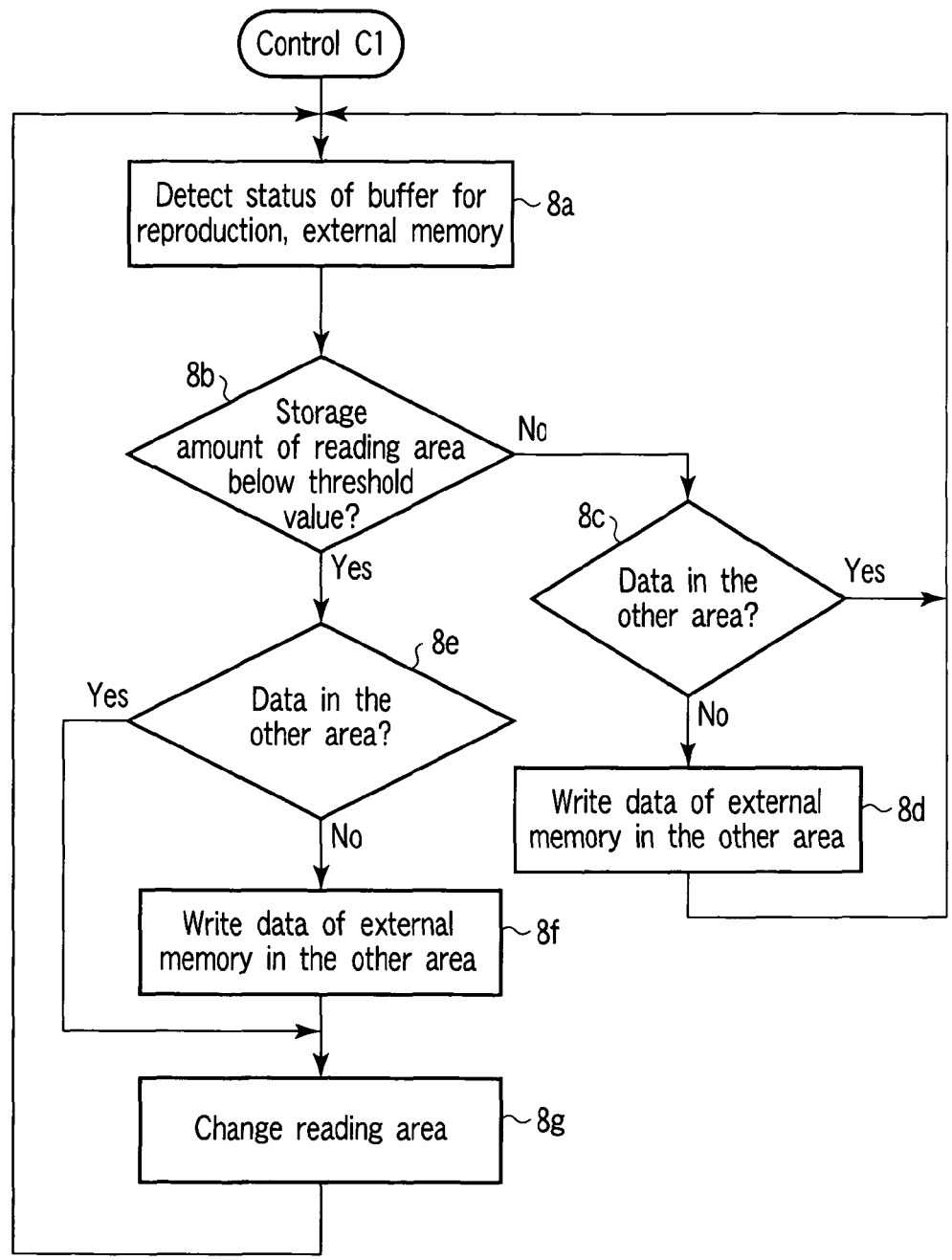
FIG. 8 is a flowchart showing an operation of a time shift data managing unit in the broadcast receiving apparatus shown in FIG. 1.

In step 5b, the time shift data managing unit 126 starts control A relating to the data storage of the buffer for storage 123 as shown in FIG. 6, control B relating to the data storage of the external memory 124 as shown in FIG. 7, and control C relating to the data storage of the buffer for reproduction 125 as shown in FIG. 8. Then, the time shift data managing unit 126 proceeds to step 5c.

Under these controls, the TS packet transferred from the PID filter 108 is temporarily stored in the buffer for storage 123 as described later, and then stored in the external memory 124 via the switch 202 and the external IF unit 204. The TS packet stored in the external memory 124 is stored in the buffer for reproduction 125 via the external IF unit 204 and the switch 203, and then output to the corresponding units of the subsequent stage via the PID filter 108 or the like through the switch 201 and the syntax analyzing unit 107. The time shift reproduction is thereby implemented.

In step 5c, the time shift data managing unit 126 discriminates whether or not the amount of the data stored in the external memory 124 reaches a preset first threshold value and then becomes below a second threshold value (<first threshold value). If the time shift data managing unit 126 discriminates that the data amount becomes below the second threshold value, the time shift data managing unit 126 proceeds to step 5e. If the time shift data managing unit 126 does not discriminate that the data amount becomes below the second threshold value, the time shift data managing unit 126 proceeds to step 5g.

In step 5d, the time shift data managing unit 126 discriminates whether or not the notification to change the time shift reproduction mode to the general reproduction mode as transmitted from the demultiplex mode control unit 105 is detected. If the notification to change the time shift reproduction mode to the general reproduction mode is detected (as corresponding to step 4g), the time shift data managing unit 126 proceeds to step 5e. If the notification is not detected, the time shift data managing unit 126 proceeds to step 5c.

In step 5e, the time shift data managing unit 126 discriminates whether or not the notification detected in step 5d is made in response to the user's request. If the notification is made in response to the user's request, the time shift data managing unit 126 proceeds to step 5f. If the notification is not made in response to the user's request, the time shift data managing unit 126 proceeds to step 5g.

In step 5f, the time shift data managing unit 126 erases the data for time shift reproduction stored in the external memory 124, through the external IF unit 204, and ends this process.

Figure 9:
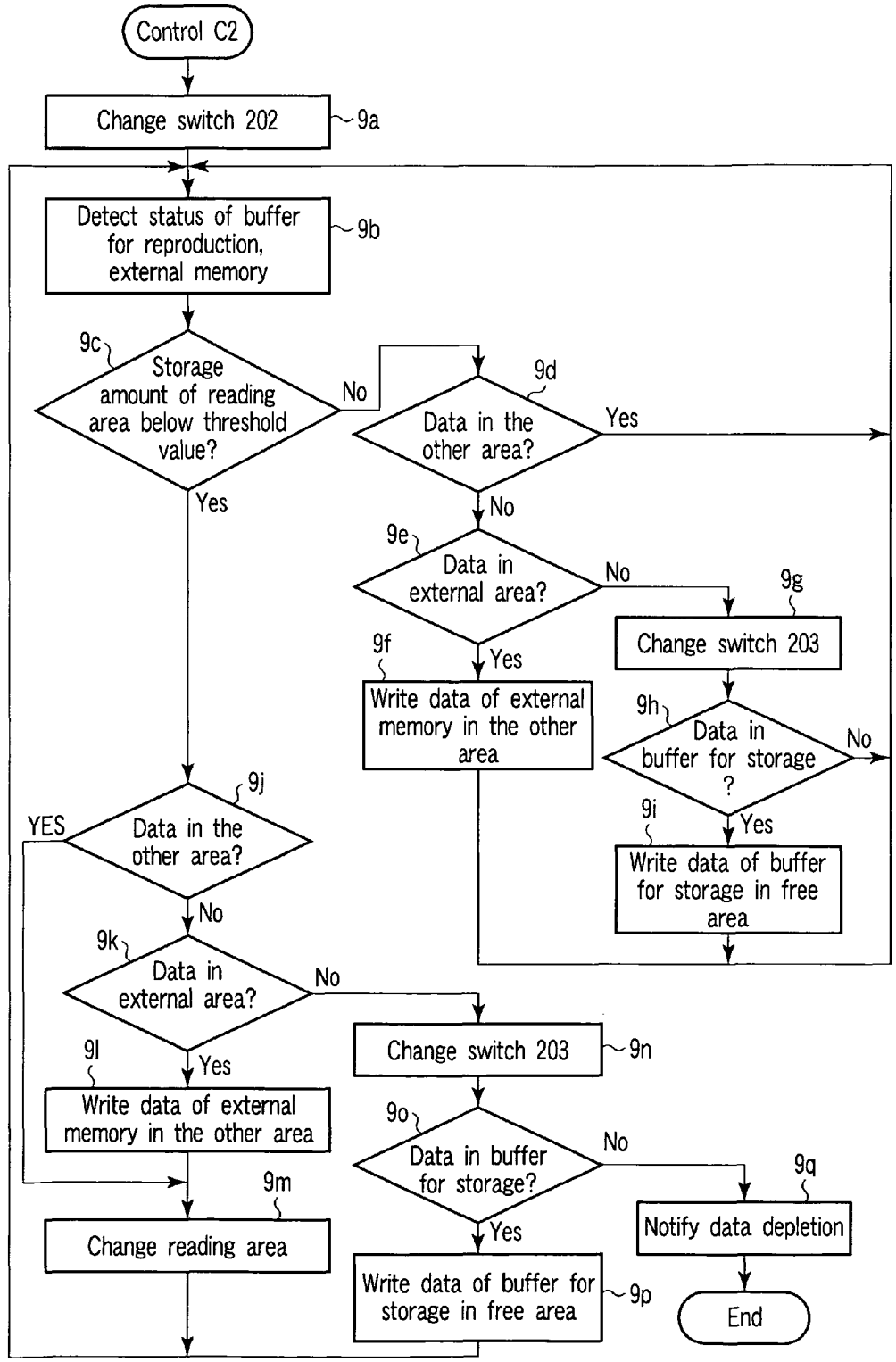
FIG. 9 is a flowchart showing an operation of a time shift data managing unit in the broadcast receiving apparatus shown in FIG. 1.

In step 5g, the time shift data managing unit 126 continuously executes the control A stated in step 5b and stops the control B. In addition, the time shift data managing unit 126 starts control C2 as shown in FIG. 9 instead of the control C1, as the control concerning the data storage of the buffer for reproduction 125, and ends this process.

Under these controls, transfer of the TS packet from the buffer for storage 123 to the external memory 124 is stopped as described later and then the time shift reproduction mode is changed to the general reproduction mode in accordance with the depletion of the TS packet stored in the external memory 124 and the buffer for storage 123.

Figure 5:
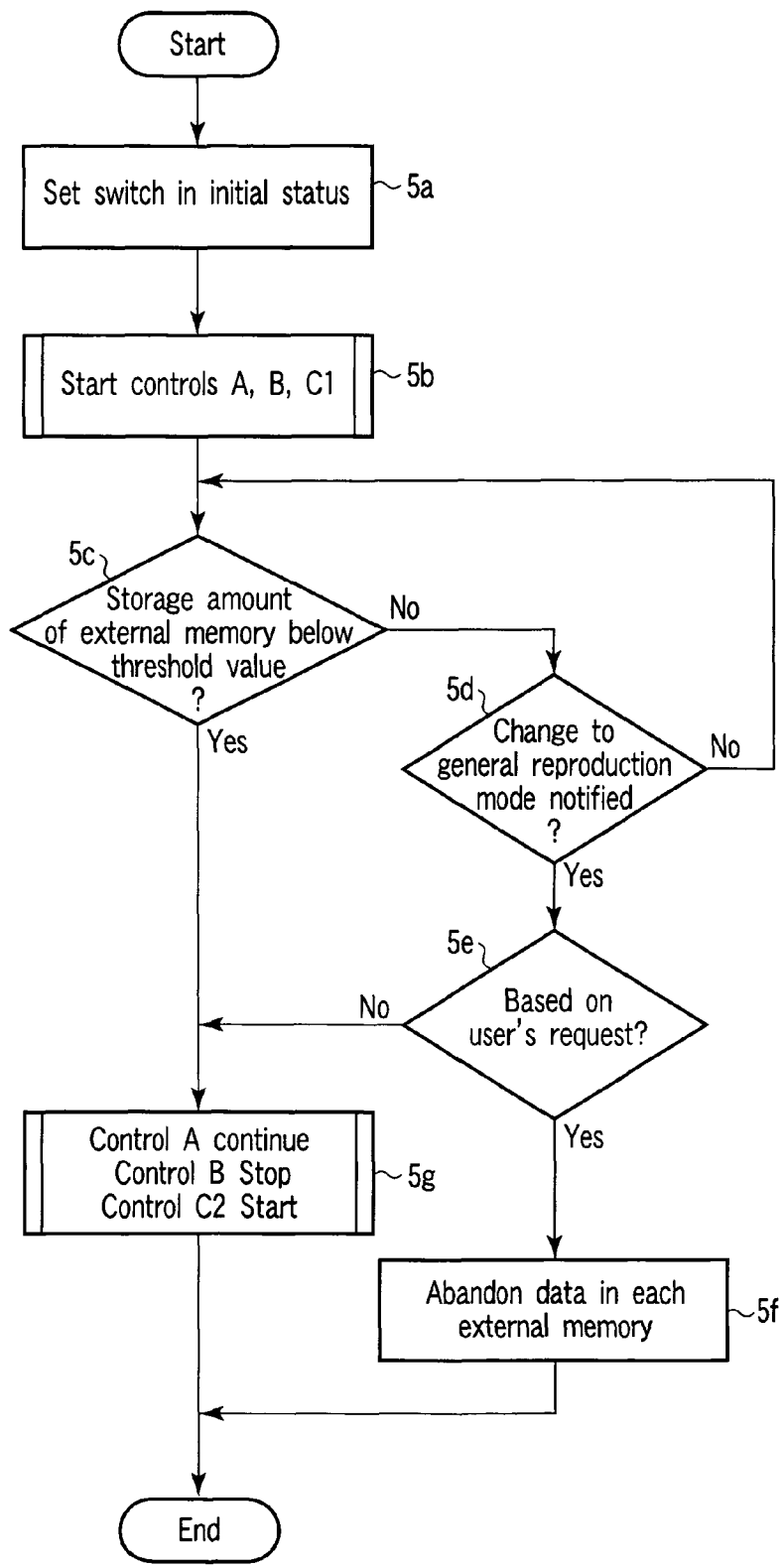
FIG. 5 is a flowchart showing an operation of a time shift data managing unit in the broadcast receiving apparatus shown in FIG. 1.

Next, the control A shown in FIG. 6 is described. The control A is a control relating to change the data storage in the buffer for storage 123 and the change of the memory area for reading. The control is executed by the time shift data managing unit 126 and can be executed simultaneously with the controls B, C1 and C2. In FIG. 5, the control is executed simultaneously with the controls B and C1, in step 5b, and simultaneously with the control C2, in step 5e. The flowchart shown in FIG. 6 is repeated.

First, in step 6a, the time shift data managing unit 126 detects the status of the data stored in the buffer for storage 123. More specifically, the time shift data managing unit 126 discriminates whether or not the TS of one block is stored in each of the two storage areas provided in the buffer for storage 123.

In step 6b, the time shift data managing unit 126 discriminates whether or not a request for acceptance of the TS packet is transmitted from the PID filter 108. If the request for acceptance of the TS packet is transmitted from the PID filter 108, the time shift data managing unit 126 proceeds to step 6f. If the request for acceptance of the TS packet is not transmitted, the time shift data managing unit 126 proceeds to step 6c.

In step 6c, the time shift data managing unit 126 discriminates whether or not the amount of the data stored in the storage area transferring the data to the external memory 124, of the two storage areas provided in the buffer for storage 123, becomes below a preset third threshold value, on the basis of the detection result in step 6*a*. If the time shift data managing unit 126 discriminates that the data amount becomes below a third threshold value, the time shift data managing unit 126 proceeds to step 6*d*. If the time shift data managing unit 126 does not discriminate that the data amount becomes below a third threshold value, the time shift data managing unit 126 proceeds to step 6*a*.

In step 6*d*, the time shift data managing unit 126 discriminates whether or not the data of one block is stored in the storage area that does not transfer the data to the external memory 124, of the two storage areas provided in the buffer for storage 123. If the data of one block is stored, the time shift data managing unit 126 proceeds to step 6*e*. If the data of one block is not stored, the time shift data managing unit 126 proceeds to step 6*a*.

In step 6*e*, the time shift data managing unit 126 confirms that the storage area transferring the data to the external memory 124 becomes free and then sets the other storage area filled with the TS packet of one block as the storage area to transfer the data to the external memory 124. The time shift data managing unit 126 proceeds to step 6*a*. After that, the data is transferred from this storage area to the external memory 124 until the data in the storage area runs out.

In step 6*f*, the time shift data managing unit 126 discriminates whether or not the data of one block is stored in the storage area that does not transfer the data to the external memory 124, of the two storage areas provided in the buffer for storage 123, on the basis of the detection result in step 6*a*. If the data of one block is stored, the time shift data managing unit 126 proceeds to step 6*h*. If the data of one block is not stored, the time shift data managing unit 126 proceeds to step 6*g*.

In step 6*g*, the time shift data managing unit 126 records the TS packet transferred from the PID filter 108 in the free storage area of the buffer for storage 123. The time shift data managing unit 126 proceeds to step 6*a*.

In step 6*h*, the time shift data managing unit 126 abandons the data stored in the storage area filled with the TS packet of one block, and instead records the TS packet transferred from the PID filter 108. The time shift data managing unit 126 proceeds to step 6*a*.

Under the control A, when a request for transfer is provided by the PID filter 108, the TS packet transferred from the PID filter 108 is recorded in the storage area where transfer of the data to the external memory 124 is not set, of the two storage areas provided in the buffer for storage 123. If the data of one block has been stored, the data is overwritten and saved. If the data is transferred to the external memory 124 and one of the storage areas becomes below the third threshold value, it is confirmed that the remaining data is transferred and the other storage area is newly set as the storage area to transfer the data to the external memory 124.

Next, the control B shown in FIG. 7 is described. The control B is a control relating to the data storage in the external memory 124. The control is executed by the time shift data managing unit 126 and can be executed simultaneously with the controls A, C1 and C2. In FIG. 5, the control is executed simultaneously with the controls A and C1, in step 5*b*. When the control of the flowchart shown in FIG. 7 is started, the control is repeated until step 5*e*.

First, in step 7*a*, the time shift data managing unit 126 discriminates whether or not the storage area where the TS packet of one block is stored is present in the buffer for storage 123. If the storage area where the TS packet of one block is stored is present, the time shift data managing unit 126 proceeds to step 7*b*. If the storage area where the TS packet of one block is stored is not present, the time shift data managing unit 126 executes the same discrimination in step 7*a* and awaits until the TS packet of one block is stored in the storage area of the buffer for storage 123.

In step 7*b*, the time shift data managing unit 126 detects the status of the data stored in the external memory 124. Then, the time shift data managing unit 126 proceeds to step 7*c*.

In step 7*c*, the time shift data managing unit 126 discriminates whether or not the external memory 124 has the free storage area, i.e. the storage area which is not filled with the TS packet of one block, on the basis of the detection result in step 7*b*. If the external memory 124 has the free storage area, the time shift data managing unit 126 proceeds to step 7*d*. If the external memory 124 does not have the free storage area, the time shift data managing unit 126 proceeds to step 7*e*.

In step 7*d*, the time shift data managing unit 126 controls the external IF unit 204 such that the TS packet is read from the storage area of the buffer for storage 123 filled with the TS packet of one block and recorded in the free storage area of the external memory 124, and ends this controls.

In step 7*e*, the time shift data managing unit 126 controls the external IF unit 204 such that the data is abandoned in one of the storage areas of the external memory 124 filled with the TS packet of one block and that the TS packet is read from the storage area of the buffer for storage 123 filled with the TS packet of one block. The time shift data managing unit 126 ends this process.

Under the control B, if the time shift data managing unit 126 detects that the storage area transferring the data to the external memory 124, of the two storage areas provided in the buffer for storage 123, is filled with the TS packet of one block, the time shift data managing unit 126 reads and records the data in the free area of the external memory 124. If the free storage area is not present, the data is overwritten on the previous data and saved.

Next, the control C1 shown in FIG. 8 is described. The control C1 is a control relating to the data storage in the buffer for reproduction 125 and the change of the read storage area. The control is executed by the time shift data managing unit 126 and can be executed simultaneously with the controls A and B. In FIG. 5, the control is executed simultaneously with the controls A and B, in step 5*b*. When the control of the flowchart shown in FIG. 8 is started, the control is repeated until step 5*e*.

First, in step 8*a*, the time shift data managing unit 126 discriminates detects the status of the data stored in each of the buffer for reproduction 125 and the external memory 124. Then, the time shift data managing unit 126 proceeds to step 8*b*.

In step 8*b*, the time shift data managing unit 126 discriminates whether or not the amount of the data stored in the storage area transferring the data to the syntax analyzing unit 107, of the two storage areas provided in the buffer for reproduction 125, becomes below a preset fourth threshold value (for example, "0"), on the basis of the detection result in step 8*a*. If the time shift data managing unit 126 discriminates that the data amount becomes below the preset fourth threshold value, the time shift data managing unit 126 proceeds to step 8*f*. If the time shift data managing unit 126 does not discriminate that the data amount becomes below the preset fourth threshold value, the time shift data managing unit 126 proceeds to step 8*c*.

In step 8*c*, the time shift data managing unit 126 discriminates whether or not the data of one block is stored in the storage area that does not transfer the data to the syntax analyzing unit 107, of the two storage areas provided in the buffer for reproduction 125. If the data of one block is stored, the time shift data managing unit 126 proceeds to step 8*a*. If the data of one block is not stored, the time shift data managing unit 126 proceeds to step 8d.

In step 8d, the time shift data managing unit 126 controls the IF unit 204 to read the data from the external memory 124 and write the data in the storage area that does not transfer the data to the syntax analyzing unit 107 such that the storage area is filled with the TS packet of one block. The time shift data managing unit 126 proceeds to step 8a.

In step 8e, the time shift data managing unit 126 discriminates whether or not the data of one block is stored in the storage area that does not transfer the data to the syntax analyzing unit 107, of the two storage areas provided in the buffer for reproduction 125. If the data of one block is stored, the time shift data managing unit 126 proceeds to step 8g. If the data of one block is not stored, the time shift data managing unit 126 proceeds to step 8f.

In step 8f, the time shift data managing unit 126 controls the IF unit 204 to read the data from the external memory 124 and write the data in the storage area that does not transfer the data to the syntax analyzing unit 107 such that the storage area is filled with the TS packet of one block. The time shift data managing unit 126 proceeds to step 8g.

In step 8g, the time shift data managing unit 126 confirms that the storage area transferring the data to the syntax analyzing unit 107 becomes free, and then newly sets the other storage area filled with the TS packet of one block, as the storage area to transfer the data to the syntax analyzing unit 107. The time shift data managing unit 126 proceeds to step 8a. After that, the data is transferred from this storage area to the syntax analyzing unit 107 until the data in the storage area runs out.

Under the control C1, one of the two storage areas provided in the buffer for reproduction 125 is used as the storage area to transfer the data to the syntax analyzing unit 107 and, during this period, the data of one block read from the external memory 124 is stored in the other storage area. When the data is transferred to the syntax analyzing unit 107 and one of the storage areas becomes below the fourth threshold value, it is confirmed that the remaining data has been transferred and the other storage area is newly set as the storage area to transfer the data to the syntax analyzing unit 107.

Next, the control C2 shown in FIG. 9 is described. The control C2 is a control relating to the data storage in the buffer for reproduction 125 and the change of the read storage area. The control is executed by the time shift data managing unit 126 and can be executed simultaneously with the controls A and B. In FIG. 5, the control is executed simultaneously with the control A, in step 5g When the control of the flowchart shown in FIG. 9 is started, the control is repeated until the time shift reproduction mode is ended.

First, in step 9a, the time shift data managing unit 126 changes the switch 202 such that the data read from the buffer for storage 123 is transferred to the switch 203. Then, the time shift data managing unit 126 proceeds to step 9b.

In step 9b, the time shift data managing unit 126 discriminates detects the status of the data stored in each of the buffer for reproduction 125 and the external memory 124. Then, the time shift data managing unit 126 proceeds to step 9c.

In step 9c, the time shift data managing unit 126 discriminates whether or not the amount of the data stored in the storage area transferring the data to the syntax analyzing unit 107, of the two storage areas provided in the buffer for reproduction 125, becomes below a preset fourth threshold value, on the basis of the detection result in step 9b. If the time shift data managing unit 126 discriminates that the data amount becomes below the preset fourth threshold value, the time shift data managing unit 126 proceeds to step 9j. If the time shift data managing unit 126 does not discriminate that the data amount becomes below the preset fourth threshold value, the time shift data managing unit 126 proceeds to step 9d.

In step 9d, the time shift data managing unit 126 discriminates whether or not the data of one block is stored in the storage area that does not transfer the data to the syntax analyzing unit 107, of the two storage areas provided in the buffer for reproduction 125. If the data of one block is stored, the time shift data managing unit 126 proceeds to step 9b. If the data of one block is not stored, the time shift data managing unit 126 proceeds to step 9e.

In step 9e, the time shift data managing unit 126 discriminates whether or not the data remains in the external memory 124. If the data remains in the external memory 124, the time shift data managing unit 126 proceeds to step 9f. If the data does not remain in the external memory 124, the time shift data managing unit 126 proceeds to step 9g.

In step 9f, the time shift data managing unit 126 controls the IF unit 204 to read the data from the external memory 124 and write the data in the storage area that does not transfer the data to the syntax analyzing unit 107 such that the storage area is filled with the TS packet of one block. The time shift data managing unit 126 proceeds to step 9b.

In step 9g, the time shift data managing unit 126 changes the switch 203 such that the data read from the buffer for storage 123 is transferred to the buffer for reproduction 125, since no data remains in the external memory 124. Then, the time shift data managing unit 126 proceeds to step 9h.

In step 9h, the time shift data managing unit 126 discriminates whether or not the data remains in the buffer for storage 123. If the data remains in the buffer for storage 123, the time shift data managing unit 126 proceeds to step 9i. If the data does not remain in the buffer for storage 123, the time shift data managing unit 126 proceeds to step 9b.

In step 9i, the time shift data managing unit 126 controls the IF unit 204 to read the data from the buffer for storage 123 and write the data in the storage area that does not transfer the data to the syntax analyzing unit 107. The time shift data managing unit 126 proceeds to step 9b.

In step 9j, the time shift data managing unit 126 discriminates whether or not the data of one block is stored in the storage area that does not transfer the data to the syntax analyzing unit 107, of the two storage areas provided in the buffer for reproduction 125. If the data of one block is stored, the time shift data managing unit 126 proceeds to step 9m. If the data of one block is not stored, the time shift data managing unit 126 proceeds to step 9k.

In step 9k, the time shift data managing unit 126 discriminates whether or not the data remains in the external memory 124. If the data remains in the external memory 124, the time shift data managing unit 126 proceeds to step 9l. If the data does not remain in the external memory 124, the time shift data managing unit 126 proceeds to step 9n.

In step 9l, the time shift data managing unit 126 controls the IF unit 204 to read the data from the external memory 124 and write the data in the storage area that does not transfer the data to the syntax analyzing unit 107 such that the storage area is filled with the TS packet of one block. The time shift data managing unit 126 proceeds to step 9m.

In step 9m, the time shift data managing unit 126 confirms that the storage area transferring the data to the syntax analyzing unit 107 becomes free, and then newly sets the other storage area filled with the TS packet of one block, as the storage area to transfer the data to the syntax analyzing unit 107. The time shift data managing unit 126 proceeds to step 9b. After that, the data is transferred from this storage area to the syntax analyzing unit 107 until the data in the storage area runs out.

In step 9n, the time shift data managing unit 126 changes the switch 203 such that the data read from the buffer for storage 123 is transferred to the buffer for reproduction 125, since no data remains in the external memory 124. Then, the time shift data managing unit 126 proceeds to step 9o.

In step 9o, the time shift data managing unit 126 discriminates whether or not the data remains in the buffer for storage 123 (or whether or not the amount of the remaining data is equal to or larger than a fifth threshold value). If the data remains in the buffer for storage 123, the time shift data managing unit 126 proceeds to step 9p. If the data does not remain in the buffer for storage 123, the time shift data managing unit 126 proceeds to step 9q.

In step 9p, the time shift data managing unit 126 reads the data from the buffer for storage 123 and writes the data in the storage area that does not transfer the data to the syntax analyzing unit 107. The time shift data managing unit 126 proceeds to step 9b.

In step 9q, the time shift data managing unit 126 notifies the demultiplex mode control unit 105 that the data stored in the buffer for time shift reproduction (buffer for storage 123, external memory 124 and buffer for reproduction 125) has been depleted, and ends this process. The demultiplex mode control unit 105 thereby discriminates that the data stored in the buffer for time shift reproduction is depleted soon (step 4e).

Under the control C2, one of the two storage areas provided in the buffer for reproduction 125 is used as the storage area to transfer the data to the syntax analyzing unit 107 and, during this period, the data of one block read from the external memory 124 is stored in the other storage area.

When the data is transferred to the syntax analyzing unit 107 and one of the storage areas becomes below the fourth threshold value, it is confirmed that the remaining data is transferred and the other storage area is newly set as the storage area to transfer the data to the syntax analyzing unit 107.

In addition, since the data stored in the external memory 124 runs out, the transfer route of the TS packet is changed to the route not via the external memory 124, but via the only internal memory (buffer for storage 123 and buffer for reproduction 125). After that, when the data stored in the internal memory runs out, demultiplex mode control unit 105 is notified of this matter.

In the above descriptions, the apparatus operates in accordance with whether or not the data of one block is stored. In a process in which the time shift reproduction mode is changed to the general reproduction mode, all the data stored in the buffer for storage 123 and the buffer for reproduction 125 are reproduced. Even if the amount of the stored data is smaller than one block, the apparatus operates to positively transfer the stored data to the syntax analyzing unit 107.

As described above, the broadcast receiving apparatus comprises the buffer for storage 123 at the previous stage of the external memory 124 and the buffer for reproduction 125 at the subsequent stage of the external memory 124, to store the TS packet in the external memory 124 connected via the external IF unit 204 at the time shift reproduction time. When the data storage at the external memory 124 runs out as the time shift reproduction proceeds, temporary time shift is executed by the buffer for storage 123 and the buffer for reproduction 125 which can execute reading and writing at a higher speed than the external memory 124 without mediation of the external memory 124, and the time shift reproduction mode is changed to the general reproduction mode.

In other words, when the time shift reproduction is executed by storing the TS packet in the external memory 124 via the external IF unit 204 and the amount of the data stored in the external memory 124 becomes below the threshold value, the time shift reproduction is executed by using the internal memories (buffer for storage 123 and buffer for reproduction 125) capable of reading and writing the data at a higher speed than the external memory 124.

Therefore, according to the broadcast receiving apparatus of the above-described configuration, when the data of a comparatively large block size is transferred to the buffer for the time shift reproduction, deterioration of the reproduction quality in a process of changing the time shift reproduction mode to the general reproduction mode can be prevented by the change of the external memory and the internal memories. In addition, since the data of a comparatively large block size is transferred, overhead of the data transferred to the buffer can be reduced.

The present invention is not limited to the embodiments described above but the constituent elements of the invention can be modified in various manners without departing from the spirit and scope of the invention. Various aspects of the invention can also be extracted from any appropriate combination of a plurality of constituent elements disclosed in the embodiments. Some constituent elements may be deleted in all of the constituent elements disclosed in the embodiments. The constituent elements described in different embodiments may be combined arbitrarily.

For example, the buffer for storage 123 and the buffer for reproduction 125 are provided as different memory buffers in the above-described embodiment. Instead of this, however, two storage areas serving as the buffer for storage 123 and two storage areas serving as the buffer for reproduction 125 may be provided in a single memory buffer.

In addition, two storage areas are provided in each of the buffer for storage 123 and the buffer for reproduction 125, but three or more storage areas may be provided therein.

In the above-described embodiment, one-segment broadcasting is described. However, the present invention is not limited to this, but may also be applied to the broadcasting using twelve segments. In addition, the present invention is not limited to the terrestrial digital broadcasting, but can also be applied to digital satellite broadcasting or digital cable broadcasting.

The present invention can also be variously modified within a scope which does not depart from the gist of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:
1. A broadcast receiving apparatus comprising:
a receiving unit which receives a broadcast signal;
a first memory which stores the broadcast data;
a first recording unit which records the broadcast data contained in the received broadcast signal, in the first memory;
a second recording unit which records the data read out from the first memory, in a second memory;

a retrieving control unit which reads out the data from the second memory;

a first reproducing unit which reproduces the data recorded in the second memory;

a data amount detecting unit which detects an amount of data recorded in the second memory and not reproduced by the first reproducing unit; and a second reproducing unit which stops reproducing of the data by the first reproducing unit and recording of the data by the second recording unit if the detected amount of the non-reproduced data in the second memory is below a predetermined threshold value, and simultaneously starts reproducing the data recorded in the first memory.

2. The broadcast receiving apparatus according to claim 1, further comprising:

a second data amount detecting unit which detects an amount of the data stored in the first memory and not reproduced by the second reproducing unit; and a third reproducing unit which stops recording of the broadcast data by the first recording unit and reproducing of the data by the second reproducing unit if the detected amount of the non-reproduced data in the first memory is below a predetermined second threshold value, and simultaneously starts reproducing the broadcast data received by the receiving unit.

3. The broadcast receiving apparatus according to claim 1, wherein the first memory comprises a first area which records the broadcast data and a second area which records the broadcast data read out from the second memory, and the first recording unit records the broadcast data received by the receiving unit, in the first area.

4. The broadcast receiving apparatus according to claim 3, wherein the second recording unit records the data which is read out from the first area of the first memory, in the second memory.

5. The broadcast receiving apparatus according to claim 1, further comprising:

a record control unit which controls the second recording unit to stop recording the broadcast data in the second memory if the data amount detecting unit detects that the data amount is below a predetermined threshold value.

6. The broadcast receiving apparatus according to claim 1, further comprising:

a reproduction control unit which controls the first reproducing unit to stop reproducing the data recorded in the second memory.

7. A broadcast receiving method comprising:

a receiving step of receiving a broadcast signal;

a first recording step of recording the broadcast data contained in the received broadcast signal, in a first memory;

a second recording step of recording the data which is read out from the first memory, in a second memory;

a retrieving control step of reading out the data from the second memory;

a first reproducing step of reproducing the data recorded in the second memory;

a data amount detecting step of detecting an amount of data recorded in the second memory and not reproduced in the first reproducing step; and a second reproducing data step of stopping reproducing of the data and recording of the data in the first reproducing step if the detected amount of data recorded in the second memory is below a predetermined threshold value, and simultaneously starting the step of reproducing the data recording in the first memory.

8. The method according to claim 7, further comprising:

a second data amount detecting step of detecting an amount of the data stored in the first memory and not reproduced in the second reproducing data step; and a third reproducing step of stopping recording of the broadcast data in the first reproducing step and reproducing the data in the second reproducing step if the detected amount of the non-reproduced data in the first memory is below a predetermined second threshold value, and simultaneously starting reproducing the broadcast data received by the receiving unit.

9. The method according to claim 7, wherein the first memory comprises a first area which records the broadcast data and a second area which records the broadcast data read out from the second memory, and in the first recording step, the broadcast data is received in the receiving step is recorded in the first area.

10. The method according to claim 9, wherein in the second recording step, the data which is read out from the first area of the first memory, is recorded in the second memory.

11. The method according to claim 7, further comprising:

a record control step of controlling the second recording step to stop recording the broadcast data in the second memory if it is detected in the data amount detecting step that the data amount is below a predetermined threshold value.

12. The method according to claim 7, further comprising:

a reproduction control step of controlling the first reproducing step to stop reproducing the data recorded in the second memory.

* * * * *